United States Patent
Krajnc

(10) Patent No.: US 10,631,381 B2
(45) Date of Patent: Apr. 21, 2020

(54) ILLUMINATION CONTROL

(71) Applicant: SIGNIFY HOLDING B.V., Eindhoven (NL)

(72) Inventor: Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/327,983

(22) PCT Filed: Aug. 22, 2017

(86) PCT No.: PCT/EP2017/071113
§ 371 (c)(1),
(2) Date: Feb. 25, 2019

(87) PCT Pub. No.: WO2018/037002
PCT Pub. Date: Mar. 1, 2018

(65) Prior Publication Data
US 2019/0230775 A1    Jul. 25, 2019

(30) Foreign Application Priority Data
Aug. 25, 2016  (EP) .................................... 16185597

(51) Int. Cl.
*H05B 37/02* (2006.01)
*H04L 12/28* (2006.01)
(Continued)

(52) U.S. Cl.
CPC ....... *H05B 37/0272* (2013.01); *G06K 9/2027* (2013.01); *G08C 17/02* (2013.01);
(Continued)

(58) Field of Classification Search
CPC .............. H05B 37/0272; H05B 37/029; H05B 37/0218; H05B 33/0842; H05B 33/0845; H05B 33/0857; H05B 33/086; H05B 33/0863; H05B 37/02; H05B 37/0227; H05B 37/0236; H05B 37/0245; H05B 37/0254; H05B 37/0263; G06K 9/2027; F24F 11/30; F24F 11/62; G05B 15/02; G05B 19/04; G05B 2219/163;
(Continued)

(56) References Cited

U.S. PATENT DOCUMENTS 6,724,159 B2    4/2004  Gutta et al.
2015/0296594 A1*  10/2015  Blum ................. H05B 37/0227
                                                       315/158
(Continued)

FOREIGN PATENT DOCUMENTS

CN        102441221 A      5/2012
CN        105188200 A     12/2015
(Continued)

*Primary Examiner* — Renan Luque
(74) *Attorney, Agent, or Firm* — Meenakshy Chakravorty

(57) ABSTRACT

A method and apparatus for controlling a lighting system for providing illumination of a space, in which detected inputs or triggers give rise to updated illumination settings or patterns of illumination. A determination is made as to whether such an update should be applied automatically, or whether confirmation from a user should be sought before making any changes.

14 Claims, 5 Drawing Sheets

(51) Int. Cl.
*G08C 17/02* (2006.01)
*G06K 9/20* (2006.01)

(52) U.S. Cl.
CPC ......... *H04L 12/282* (2013.01); *H05B 37/029* (2013.01); *H05B 37/0218* (2013.01); *H04L 2012/285* (2013.01); *H05B 37/0227* (2013.01)

(58) Field of Classification Search
CPC . G05B 2219/2642; G06F 8/654; G06F 8/658; H04B 10/116; H04B 10/502; H04L 67/34; Y02B 20/44; Y02B 20/46
See application file for complete search history.

(56) References Cited

U.S. PATENT DOCUMENTS

| | | |
|---|---|---|
| 2016/0091217 A1 | 3/2016 | Verberkt et al. |
| 2016/0171374 A1* | 6/2016 | Kim .................. G06N 5/04 706/46 |

FOREIGN PATENT DOCUMENTS

| | | |
|---|---|---|
| WO | 2007072285 A1 | 6/2007 |
| WO | 2012176098 A1 | 12/2012 |
| WO | 2016124390 A1 | 8/2016 |

* cited by examiner

|           | Scene X |     |     |     |     |
|-----------|---------|-----|-----|-----|-----|
| Luminaire | 1       | 2   | 3   | 4   | 5   |
| Brightness | 24     | 24  | -   | 16  | -   |
| Colour    | 122     | 248 | -   | 122 | -   |
| Effect    | -       | -   | -   | -   | -   |

ILLUMINATION CONTROL

CROSS-REFERENCE TO PRIOR APPLICATIONS

This application is the U.S. National Phase application under 35 U.S.C. § 371 of International Application No. PCT/EP2017/071113, filed on Aug. 22, 2017, which claims the benefit of European Patent Application No. 16185597.8, filed on Aug. 25, 2016. These applications are hereby incorporated by reference herein.

TECHNICAL FIELD

The present disclosure relates to control of illumination and illumination information in an illumination system.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device or devices according to a wireless networking protocol such as ZigBee, Wi-Fi or Bluetooth (and optionally also for sending status reports to the lighting control device using the wireless networking protocol).

Luminaires may have individually controllable parameters, such as brightness and colour, and one or more luminaires may be controlled together in a group in a coordinated manner to create an overall light distribution, or scene, for illuminating an area or space such as room in a desired manner. Combinations of different luminaires and/or different settings of the luminaires can achieve a different overall illumination of the area of space, as desired.

Rather than having to control individual luminaires, or even individual settings for the or each luminaire, in order to achieve a desired illumination, it is usually preferable for groups of settings to be stored together corresponding to a desired light distribution, or scene. For example a "morning" scene, or a "relaxing" scene can be created, and it will be understood that a large number of lighting options quickly become available.

In order to improve manageability and convenience for end users, automation or semi-automation is increasingly employed to control illumination in a lighting system such as a connected lighting system as described above. Routines and schedules can be learned and programmed, and sensors and other inputs contribute to predict and adapt illumination to a user's wants and needs.

SUMMARY

However it is difficult to anticipate the lighting needs of a user correctly all of the time, and in some circumstances a lighting system can change to setting a scene that is undesirable to a user. The system decision is based on a limited set of conditions, and while it may make correct judgements in the majority of cases, may still be "wrong" in the user's perception in some cases. There is therefore a trade-off between automatically adjusting light settings to provide a seamless and convenient experience for a user based on intelligent prediction, and a user have to provide inputs to provide desired settings manually, or to adjust or undo automatically adjusted settings.

It would be desirable to provide improved illumination control.

According to a first aspect of the present invention, there is provided a method of controlling a lighting system for providing illumination of a space, said method comprising detecting one or more input events relating to said lighting system; determining an updated illumination pattern based on said one or more input events, determining whether or not to apply said updated illumination pattern automatically; providing, in the case that the updated illumination pattern is not applied automatically, a prompt to a user indicative of said updated pattern; receiving an input from said user in response to said prompt; and controlling said lighting system to apply said updated illumination pattern conditionally in response to said received user input.

In this way some updates or changes in illumination settings or patterns may be applied automatically, where it is determined that there is a sufficient degree of confidence, or a high likelihood that the updated setting is desired by and acceptable to a user, while others associated with a lower degree of confidence or a lower likelihood will be applied only after confirmation form a user has been obtained. This provides a minimally intrusive level of automation, while reducing unwanted automated changes.

The updated illumination pattern may be a simple change in illumination parameters for one or more lighting devices or luminaires of the system, for example a scene change in embodiments. The updated pattern may also include a duration, for which parameters or a scene are to be applied. The updated pattern may however comprise a more complex, dynamic sequence of events, such as a sequence of changes of illumination parameters.

In further embodiments, the updated pattern may be an indirect update and comprise an update to a rule or rules, or a schedule which automatically determines or recommends illumination settings, rather than an update to the illumination settings themselves.

The method may further comprise determining a confidence metric associated with said updated illumination pattern, wherein the setting is applied automatically if said confidence metric is above a threshold. The confidence metric represents an assessment of the desirability and/or acceptance of the updated illumination pattern by a user.

In embodiments, the confidence metric varies in accordance with a measure of difference between said updated illumination pattern and the pattern it is intended to update. The pattern it is intended to update or replace may simply be the current pattern or settings in examples, or may be a pattern or settings stored for future use. The difference may be determined in a multivariable way, taking into account one or more factors or parameters, such as intensity, colour, duration, time sequence or variation etc.

The confidence metric may vary in accordance with the type or types of input upon which the updated illumination pattern is based in embodiments.

Possible types of input events include inputs from one or more sensors adapted to sense conditions in or in the vicinity of said space to be illuminated. Such sensors may also include a light sensor, a temperature sensor, a humidity sensor, a motion sensor or PIR sensor and/or an RFID sensor for detecting the presence of an RFID tag or token for example. Inputs may for example relate to an activity of a user in a space illuminated by the lighting system. Inputs may also be from one or more sensors adapted to sense conditions or parameters associated with a user of the lighting system. Such sensors may include biometric sensors, for example for measuring heart rate, skin moisture, or other vital signs or biometric parameters of a user. In some cases medical indicators such as blood glucose or ECG signals could be sensed.

Other possible types of inputs include information received from an application or media store accessed over a network connected to said lighting system in embodiments. For example a lighting system may be connected to a cellular network, and/or to a wide area network such as the internet. Applications which may be accessed or provide input to a lighting system include user schedule or calendar applications, or any application which provides information of a user or user behaviour, or external events such as a weather forecast for example. Financial applications may provide data of transactions of a user in embodiments. Also social media applications may provide information which can be used as an input to determine an updated illumination pattern. Furthermore stored media such as pictures, photos, videos and/or music may be accessed by or from the lighting system.

Combinations of inputs may be used to determine an updated illumination pattern in embodiments, with information from different sources being combined according to logic rules or processing for example, to predict or recommend an illumination pattern. Furthermore inputs or combinations of inputs need not be current or simultaneous, and historical input data may be accumulated and analysed to detect sequences of behaviour, which can be used to determine updated illumination patterns, particularly where such sequences include identifiable repeated sequences or segments.

In embodiments, the confidence metric varies in accordance with previously received inputs in response to substantially the same updated illumination pattern. That is, where previous updates have been proposed or prompted, the user response (to accept or declined) may be recorded and used to assess the confidence of future updates. The timing of received inputs may also be taken into account in arriving at a confidence metric. In examples, more significance is given to inputs received relatively quickly after an update is applied, and significance diminishes with increasing time from the applied update to the received input.

Where the input or inputs on which the updated illumination pattern is based comprises a historical time sequence of inputs, the confidence metric may vary in accordance with length of said historical time sequence in embodiments. For example a longer time sequence may give rise to greater confidence, buy virtue or a greater quantity of available data for example. Alternatively or additionally, the confidence metric may vary in accordance with a measure of correlation of detected inputs within that sequence. Such correlation may be between identifiable repeated sequences mentioned above for example.

In embodiments, the updated illumination pattern comprises a time sequence of lighting settings, and the confidence metric varies in accordance with the length of said time sequence. In embodiments the updated illumination pattern relates to a point or period of time in the future, and the confidence metric varies in accordance with the time remaining until said point or the beginning of said period.

Combinations of factors can be combined to arrive at an overall confidence metric, and the combination may be numerical if numerical values can be assigned, or may be via rules or Boolean logic for example. Furthermore, a confidence metric may be dynamic, varying with time. The variation may occur before the relevant update is applied, or after the update is applied. This may be particularly relevant for updates having an associated time duration, or updates which are applied gradually over time.

According to a further aspect of the invention, there is provided a lighting control system comprising a controller adapted to receive one or more input events to said lighting control system and to determine an updated illumination pattern based on said one or more input events; a user output interface adapted to output a prompt to said user indicative of said updated pattern; and a user input interface adapted to receive an input from said user in response to said prompt; wherein said controller is adapted to determine whether or not to apply said updated illumination pattern automatically, and in the case that the updated illumination pattern is not applied automatically, apply the updated illumination pattern conditionally in response to said received user input.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
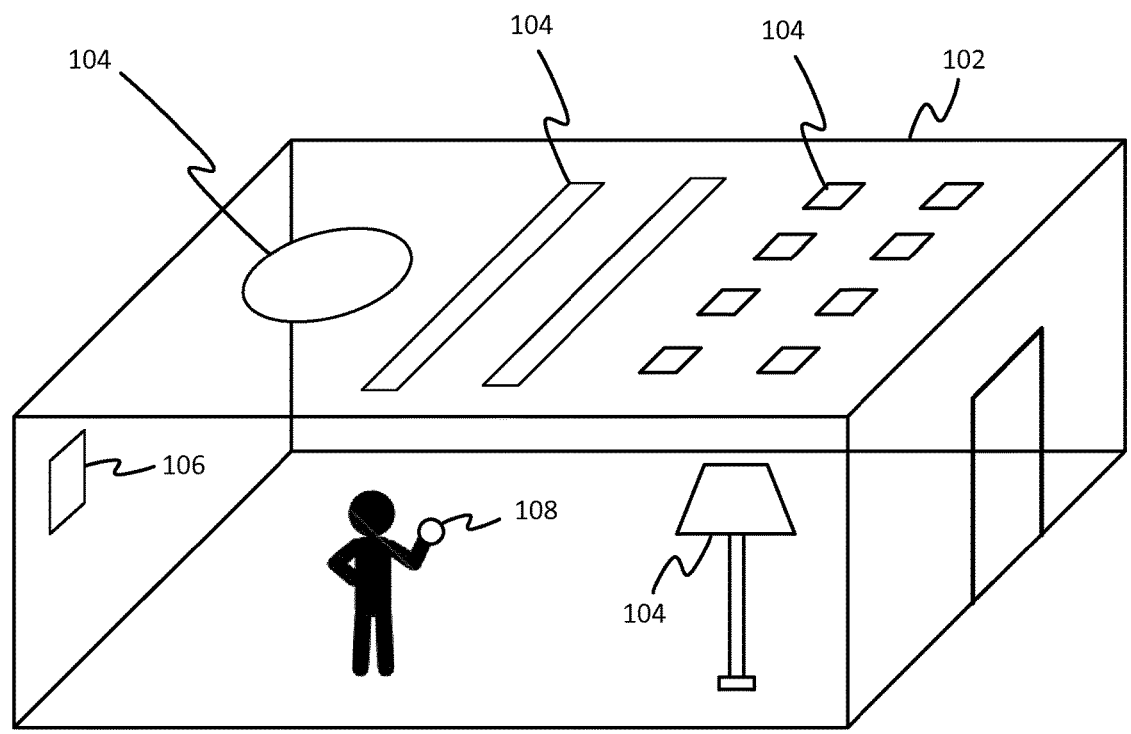
FIG. 1 shows an example of a lighting system installation.

FIG. 1 shows a lighting system installed or otherwise disposed in an environment 102, e.g. an indoor space such as a room, or an outdoor space such as a garden or park, or a partially covered space such as a gazebo, or any other space that can be occupied by one or more people such as the interior of a vehicle. The lighting system comprises one or typically a plurality of luminaires 104, each comprising one or more lamps (illumination emitting elements) and any associated housing, socket(s) and/or support. LEDs may be used as illumination emitting elements, but other alternatives such as incandescent lamps eg halogen lamps are also possible. A luminaire 104 is a lighting device for emitting illumination on a scale suitable for illuminating an environment 102 occupiable by a user. For example, a luminaire 104 may be a ceiling mounted luminaire, such as a spotlight or wall washer, a wall mounted luminaire, or a free standing luminaire such as a floor lamp or desk lamp for example (and each need not necessarily be of the same type). These luminaires can also be portable (i.e. their location can be changed easily, and can even continue to run for a limited period of time without connection to mains due to internal energy storage units).

A user can control the lighting system via a user terminal such as a wall panel 106. Alternatively or additionally a mobile user terminal 108 may be provided in order to allow the user to control the lighting system. This will typically be in the form of a smartphone, watch or tablet for example, running an application or "app", but could be a dedicated wireless lighting controller or "remote control". The user terminal or terminals comprise a user interface such as a touchscreen or a point-and-click interface arranged to enable a user (e.g. a user present in the environment 102, or located remotely in the case of a mobile terminal) to provide user inputs to the lighting control application. A user may also be able to control individual luminaires, or a system of connected luminaires by interfacing directly with the luminaire eg in the case of a table lamp.

Figure 2:
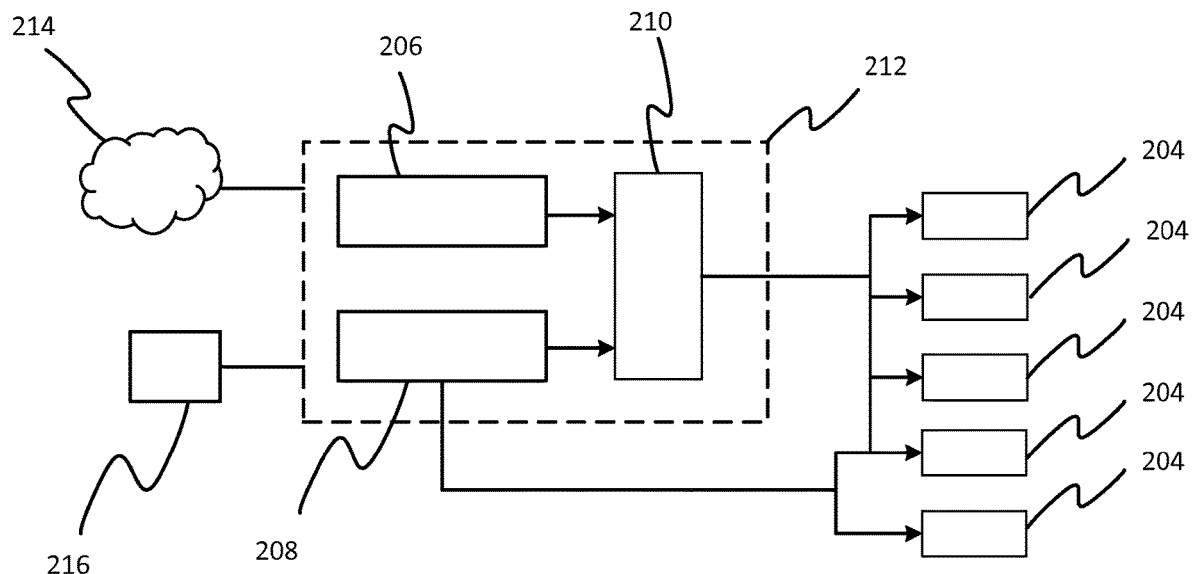
FIG. 2 illustrates a lighting system schematically.

Referring to FIG. 2, an example of a lighting system is shown schematically. A user terminal 206, connects to luminaires 204 via an intermediate device 210 such as a wireless router, access point or lighting bridge. User terminal 206 could for example be the wall panel 106 of FIG. 1, and the intermediate device could be integrated in the wall panel or provided as a separate device. User terminal 208 is a mobile user terminal, such as terminal 108 of FIG. 1, and may also connect to the luminaires via the device 210, but may additionally or alternatively connect to the luminaires directly without an intermediate device. User terminal 208 may also be spatially fixed, but share the properties of a mobile user terminal in that it can connect directly to a luminaire, such as in the case of a stand-alone wall switch. Connection between the devices may be wired, using a protocol such as DMX or Ethernet, or wireless using a networking protocol such as ZigBee, Wi-Fi or Bluetooth for example. Luminaires may be accessible only via device 210, only directly from a user terminal, or both.

A combination of connection and communication protocols can also be employed. For instance the user terminal 206 may connect to the intermediate device 210 via a first wireless access technology such as Wi-Fi, while the device 201 may connect onwards to the luminaires 4 via a second wireless access technology such as ZigBee. In this case intermediate device 210 converts the lighting control commands from one protocol to another.

Device 210 and user terminals 206 and 208 comprise a functional group illustrated schematically by dashed line and labelled 212, which group employs control logic to control the luminaires 204. This functional group may further be connected to a network, storage device or server via network interface 214. The control logic operating within the functional group 212 may therefore interact with external networks such as the internet, and various data sources and storage. In one example the control logic may communicate with a building management system as part of a wider control system including heating and ventilation functions, or an audio/video/entertainment system, or a fire and sprinkler systems for example.

Each element of the group 212 may include a memory, or have access to a storage function, which may be provided by storage device or server accessible via interface 214. Luminaires 204, or at least some of the luminaires 204, may also include a memory.

Illumination settings can be created by a user by individually adjusting or programming parameter settings of luminaries. For example a user can manually adjust one or more luminaries in a room, via inputs at wall panel 106 perhaps, or even by using controls on a particular luminaire such as a lamp 104. Values of brightness and/or colour can be altered, until the user is satisfied with the overall effect. The user can then input an instruction to a user terminal to store the current settings, and will typically assign a name or ID to the scene created. Illumination settings could also be obtained from an external source, such as the internet for example.

Thus this arrangement allows illumination to be controlled by input of user commands at the user interface of a user terminal 206 or 208, and transmission of corresponding control signals to appropriate luminaires (e.g. recalling a specified scene).

Illumination can also be controlled, or control can be augmented, based on information gathered on environmental conditions in the vicinity of the system. Ambient light levels for example can be used to automatically adjust the output of luminaires, or program certain settings. Time of day may also be used, as well as information on whether a person or persons are present, and possibly also the identity of that person(s), to control illumination output based on predetermined settings or values, or combinations of such settings or values. Such environmental conditions or information can be used by terminal 206 or 208, and/or device 210 to determine or select allow at least a degree of automation in controlling the output of luminaires 204. Automated control of settings can be augmented or overwritten by manual input if desired.

In embodiments, a sensor or sensor interface 216 provides such environmental information or inputs to one or more elements of the functional group 212. For example, sensors can include a light sensor, a PIR sensor, and/or an RFID sensor. A clock input for providing the current time of day can also be provided. A sensor or sensors may also provide biometric information of users in some cases, for example heart rate, skin moisture/humidity, activity/movement etc. This information may be provided by wearable sensors, such as a wristband or smart watch for example, which may also act as a mobile user terminal such as terminal 208.

The sensor or sensors can individually provide information to functional group 212, or may do so via one or more common interfaces. Sensors may be located on or with the user in the case of wearables, or located in or around environment 102 of FIG. 1, and could be wall or ceiling mounted for example. In embodiments, sensors could be integrated into any or luminaires 104. Additionally or alternatively, terminals 206 or 208, or device 210 may include sensors to provide such information, particularly in the case of a mobile terminal in the form of a smartphone for example.

A further source of information or input which may be used in controlling the illumination output is information obtained via network interface 214. Where the network interface accesses the internet, a huge amount of information can be accessed which can be used to determine lighting settings. Examples include weather forecasts, social media applications, news feeds, stored media such as pictures, video or music etc. An interface with an external network or networks may also be used to provide automation control, for example inputs from the internet or a mobile cellular network such as GSM can trigger a change in lighting settings. IFTTT for example allows users to create strings of conditional statements triggered based on changes to other web services such as Facebook and Instagram.

Values used to control the illumination may be stored, either locally or remotely via a network interface. Such values include user inputs such as commands at the user interface of a user terminal 206 or 208, and also any environmental information or inputs as described above. Thus a history of illumination output and the factors which led to such output can be established.

Figures 3, 4:
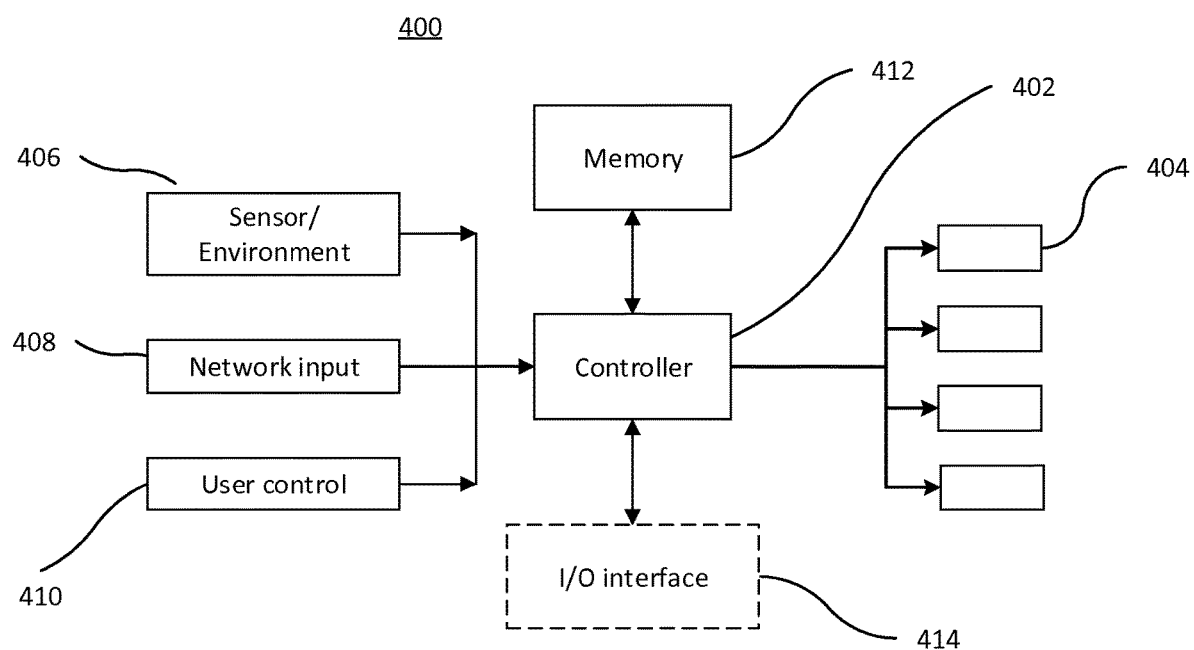
FIG. 3 illustrates data representing illumination setting for an example scene.
FIG. 4 shows a functional configuration of an example system for recommending illumination settings.

FIG. 3 illustrates data representing illumination settings for a given scene.

The data shows parameter values corresponding to different luminaries for a given scene. In this example, a lighting system includes five individually addressable luminaires, but the particular scene, say scene X, requires only three—numbers 1, 2 and 4. For each of these luminaires, a brightness value and a colour value are provided. An effect value is an example of a possible further parameter which could be included, but which is not used in this example. Luminaires 3 and 5 are not used, and therefore parameter values are not included for these luminaires, for this scene.

Single numerical values of brightness and colour are provided here as simplistic examples, but it will be understood that different embodiments may use different values or combinations of values to represent parameters. For example colour could be represented by three values in RGB or L*a*b* colour space. Colour may also be represented by colour temperature values for example.

In an example of a typical user operation for recalling a setting for use for example, the user may view a list of possible settings on a smartphone acting as a mobile user terminal 108. Using a touchscreen interface on the smartphone, the user can scroll and select a particular setting or scene identified by a name or ID.

FIG. 4 shows a functional configuration of an exemplary lighting control system.

A controller 402 controls the outputs of luminaires 404 in response to input and/or triggers provided by one or a combination of sensors/environmental inputs 406, network inputs 408, and user controls 410. A memory 412 stores system parameters such as the inputs and outputs received by and provided by the controller 402, and thus can build up a history of events and patterns of use over periods of time. Such a history may be associated with a particular user or users for example, and can be analysed to determine certain schedules or preferences for example. The controller may also use such stored history data in providing appropriate control settings for luminaires 404. As will be described in greater detail below, controlling the luminaires may comprise automatically adjusting values and settings based on inputs, current and/or historical, or may comprise determining or selecting values and settings to propose or recommend to a user, which may then be accepted or rejected.

Memory 412 may be a particular memory location or address in a larger memory, used to store data such as that shown in FIG. 3, for particular stored scenes. Memory 410 may however be a separate, dedicated memory.

The controller is also connected to a confirmation input/output interface 414, to provide information of proposed light settings and/or patterns (which may be temporal patterns) to a user and receive instructions from a user in relation to those proposed settings and patterns. The confirmation i/o interface may be provided in the form of a GUI, using a touchscreen for example, which may be embodied in a user terminal such as terminals 206 or 208 of FIG. 2 for example. However the i/o interface may be provided by other or further components, and the input and output functions may be provided by separate components. For example, where the controller is networked with an audio/video system, or home entertainment system for example, the output could be an audio or video output, over a speaker system or a television or projector. The input aspect could be handled separately, via a wall panel or switch for example, or via a mobile device such as a smart watch or smartphone.

Considering the above, it should be understood that the functions of the controller 402 and the memory 412 may be implemented in the same physical device or in different devices. The functions of the controller and the memory may be implemented in a single physical device such as a user terminal, such as 106 or 108 of FIG. 1, or 206 or 208 of FIG. 2, or an intermediate device such as 210 of FIG. 2.

Alternatively the functions may be distributed between such devices in a grouping such as 212 of FIG. 2, and some functions may additionally or alternatively be distributed to a network via interface 214 of FIG. 2. Accordingly, in one exemplary embodiment, the controller 402 is implemented in a mobile user terminal 208 of FIG. 2, and memory 410 is implemented in a lighting bridge acting as an intermediate device 210 of FIG. 2.

Figure 5:
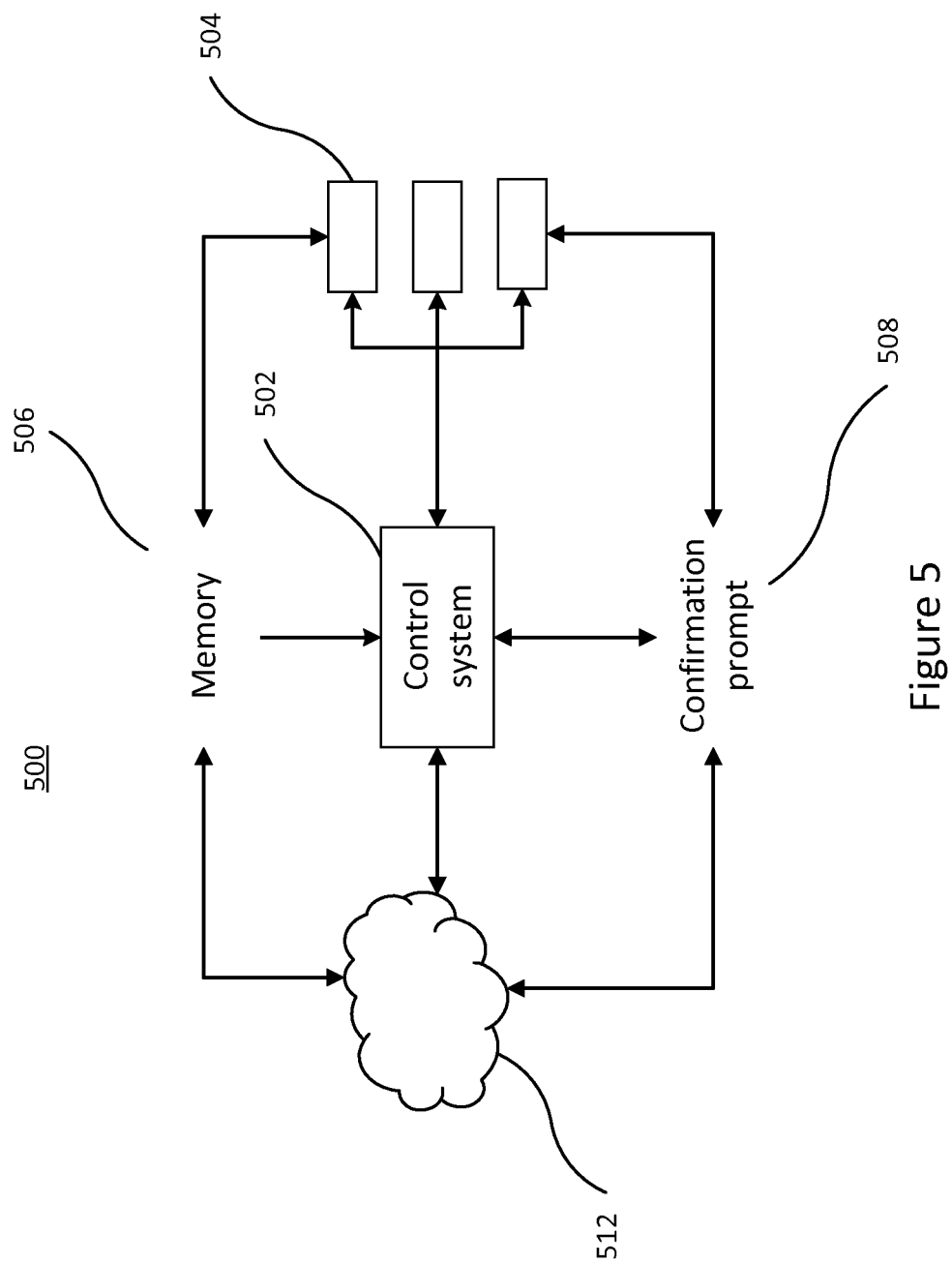
FIG. 5 shows an alternative configuration of an example system for recommending illumination settings.

Thus at a higher level an example lighting system can be illustrated generally as shown in FIG. 5. The lighting system is schematically represented as a control system 502 employing control logic and connected to luminaires 504, and also in communication with a network 512.

The control system in this example can be considered as the collaboration of functions operating locally to control the luminaires 504. Thus the control system may be embodied by one or more or all of functional group 212 of FIG. 2. In embodiments, a mobile device 208 acting as a user terminal can be considered to form part of the control system of FIG. 5, particularly in the case that communication between the mobile device and luminaires 504 is enabled. However in other embodiments such a mobile device is instead considered as part of network 512 of FIG. 5. Control system 502 may include sensors, such as light sensors and motion sensors, and other sensor types mentioned above.

However, in some embodiments, some or all of the control functions for controlling luminaires 504 may be performed by the network, 512, passing control information to control system 502 acting as a client, to control luminaires 504.

Network 512 represents functions which may receive input from, or provide input to the control system 502. The network may for example comprise the internet or a mobile cellular network, and functions may be provided by servers or devices within the network or networks. Sensors as mentioned above may also operate at a network level and provide inputs to the lighting system and control system 502 via the network.

Memory 506 serves substantially the same purpose as memory 412 of FIG. 4. From FIG. 5, it can be seen that the memory function can interact with the lighting system directly via the control logic 502, via luminaires 504 and/or via network 512.

Thus in one example, memory 506 runs in a device such as intermediate device 210 embodying control system 502. Alternatively, the memory is implemented in a smartphone (possibly running a dedicated application or app) where it can detect and store input and output events processed by the control logic. A third option is that this module runs at an individual light source. In this case, it can keep track light settings or control commands directly at the light source. Finally, it could run in a cloud service that keeps track of the light settings.

Confirmation prompt 508 serves substantially the same purpose as the output function of i/o interface 414 of FIG. 4. Thus, when control system determines that user input is required to confirm a change in illumination settings, a prompt is provided to seek such input. From FIG. 5, it can be seen that this prompt can be provided via the control system 502, via luminaires 504 and/or via network 512.

The prompt may take a number of forms. The prompt may be displayed on a control panel of a user interface, such as a wall panel or a mobile user interface such as a smartphone or watch for example. A prompt may be indicated by a light output from the luminaires in some cases. For example applying a change from a low brightness to a high brightness setting may be recommended by a dim glow from a bedside or desk lamp. An audio prompt may be provided such as a beep or a specific sound or tone, or even synthesised or recorded speech. In such examples a user may understand what a given prompt refers to by learning the prompt or programming the prompt in examples. The prompt may further be an email or SMS message or other form of text based message or push notification to an appropriate device, in the case an update is proposed for a future light setting.

A user may provide a response to the prompt to accept or decline a proposed change in illumination settings. The response can be provided by a variety of devices or user interfaces, such as a user terminal operating either as (or as part of) control system 502, or via a network 512, which may be in the form of a smart device such as a phone, tablet, watch or other wearable device. The response may be provided on or at a dedicated lighting controller, such as a wall panel, operating as control system 502. A response may further be made to a luminaire or lighting device 504 of the system, or a sensor providing information to the system. The sensor may form part of the control system 502, or be a networked device represented by 512.

Figure 6:
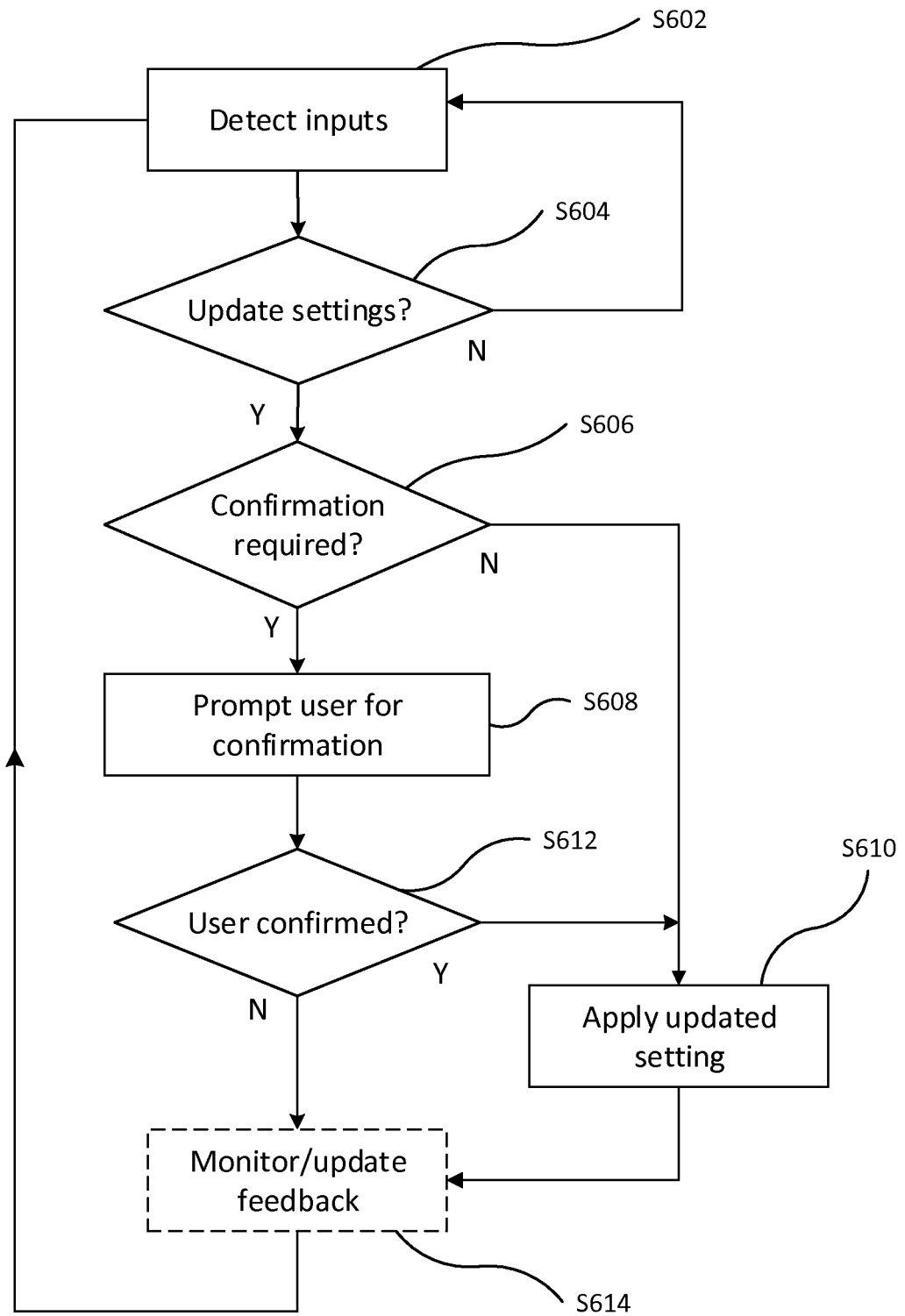
FIG. 6 is a flow diagram illustrating an example of a process for recommending illumination settings.

Possible examples of responses include:
A tap or touch on a touch sensitive light source
A touch on a touch screen device (e.g. smartphone, watch or tablet)
A voice command
A key or button press on a control device, or a combination of key or button presses
An action (such as a toggle action) on a power switch or controller of a lighting device.
A dedicated button or input on a device
An action to be detected by a motion sensor FIG. 6 is a flow diagram illustrating an example of a process for recommending illumination settings.

At step S602, an input or inputs to the lighting system is detected. In particular a change to an input or inputs, or an input event may be detected. This may be any of the inputs described above, for example inputs represented by 406, 408 and/or 410 of FIG. 4. The detection may be substantially continuous, acting as a monitoring phase.

At step 604 it is determined whether or not an illumination setting or pattern should be updated in response to the input(s) detected at S602. A change will typically be recommended in response to a change in inputs detected in S602, i.e. when a trigger event has occurred. If a trigger has not occurred, or if a trigger has occurred but it does not result in any update of light settings, the process returns to monitor inputs. If a change of settings does result ("yes" to step S604) then the process advances to step S606, to be described below. It should be noted that an update will often be to change the lighting settings at the present time but may also be an update for a time in the future, or an update in a lighting pattern or schedule for the future, triggered by a current input or change of input. For example, a recommendation may be based on a pattern or history of use or behaviours, determined through monitoring and storing of inputs. Control logic may analyse such patterns and, if a sufficiently clear trend emerges, use this trend to predict desired light settings in the future. A current event or input may make a trend or pattern sufficiently significant, in conjunction with a history of events or inputs, to predict such a setting.

Similarly, an update need not be an instantaneous update, and it can be an update to a time sequence of lighting settings or a pattern of lighting settings extending over a period of time.

Figure 7:
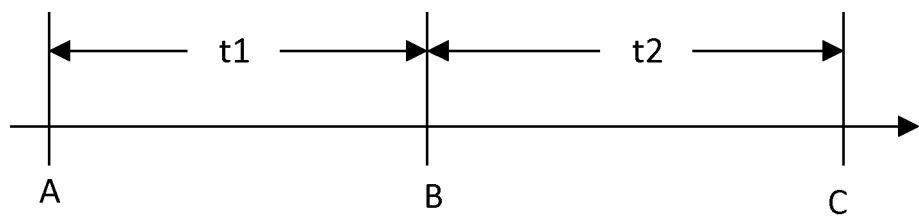
FIG. 7 is a timeline illustrating the temporal nature of an example illumination pattern update.

FIG. 7 illustrates a temporal aspect of an exemplary update to a lighting setting or settings. A timeline is shown with three defined points in time, A, B and C. Point A represents a current point in time, defined at a detected input or event. Point B represents a start time of an updated lighting setting or pattern, and point C represents an end time of that updated lighting setting or pattern. Time period t1 represents the time from the trigger or input until the start of the updates lighting settings, and time period t2 represent the time duration of the recommended update. Considering an example to illustrate these time periods, a trigger may be a user turning on a bedroom light to an intense setting at 5.30 am on a Wednesday, and then turning it off again at 6.15 am. The same event may have occurred on the preceding Monday and Tuesday, and the lighting controller determines on the third occurrence that this may be a regular pattern, for example the user is going for morning runs before work that week. An update occurs to set the bedroom light to turn on to the intense setting at 5.30 am on Thursday, and to turn off at 6.15 am. Thus in this example period t1 is just under 24 hours, and t2 is 45 minutes.

Returning to FIG. 6, an input or trigger detected in S602 can take a wide range of forms, as will be described in greater detail below.

A control trigger is an input by a user to change light settings, by any of the means provided by a system, such as a wall panel, mobile user terminal or a switch or interface on a luminaire, in substantially the usual way.

A sensor based trigger refers to the output of sensors, such as light sensors, motion sensors, thermal sensors, presence sensors etc, which may be located in the vicinity of the lighting system, or the space it illuminates. A sensor based trigger may also be from a sensor based on or worn by a user such as a bio sensor taking readings such as heart rate, skin moisture, user motion etc.

For example, a light sensor can provide data on ambient light conditions—e.g. night, day, direct sunlight, overcast etc. and a light trigger can result by increasing illumination in darker conditions, or decreasing illumination in brighter conditions for example. A motion sensor or PIR sensor can monitor for presence or movement of a person for example, and detection of movement may trigger a light or lights to be turned on, or changed state. An RFID receiver may act as a presence sensor to detect and determine the ID of a person or object carrying or having an RFID tag or token. A beacon or beacons can also be used located in a space such as a room, which interact with a user device such as a smartphone for example, which interaction determines the presence and/or location of that device. Such beacons can be FR beacons. A trigger to change to a particular lighting setting may occur when a particular user is sensed in a space for example. In addition the presence of a user may allow detected inputs to be associated with that user.

A clock or time input may also be used in providing automation control, optionally in combination with programmed or learned behavioural patterns, to learn the schedule and preferences of a user, such as circadian rhythms. For example, the lighting system can automatically be set to a "morning" setting at a specific time each day, or a setting may remain for a certain period of time after a user has left a space.

Inputs obtained from a network interface may include inputs to a heating/cooling system, or to an audio/video/entertainment system where such systems are linked to the lighting system. Inputs may also be obtained from network based applications such as a shared calendar or social media. For example, a lighting system could receive an input of an event in a diary such as a party, or a meeting or presentation, and may also receive an input of the location of such an event.

Combinations of sensor inputs, time inputs, network inputs, user data preferences etc. can be combined using control logic, to provide to assess or predict whether an update in the illumination settings of the system are appropriate.

If an update is determined in step S604, the process proceeds to step S606 where it is determined whether confirmation from a user is required before that update is implemented. A number of considerations may be taken into account in assessing whether a given update should be applied automatically, or whether user confirmation should be sought first. In this example a confidence metric is associated with the update, and if the confidence metric is equal to or greater than a threshold value, then it is determined that no confirmation is required. Otherwise it is considered that user confirmation is required. Factors which may be used to determine the confidence metric are discussed below.

One factor on which the confidence metric may be based is the difference between the current light setting and the updated light setting. The difference may be a difference in colour, intensity, time or pattern for example, or a combination of such parameters. If the difference is small, for example a subtle change in hue, or colour temperature, it is considered that a user is less likely to be very unhappy with the updated setting, and would not want to be distracted by having to confirm it. Therefore a high confidence metric is favoured. If the change is large, for example a sudden change in brightness, it is considered that this could have a big impact on a user, and therefore confirmation is worthwhile, and a low metric is assigned.

Another factor is the type of event or input which has resulted in the update. Certain types of input, may be judged more reliable that others, and carry a higher confidence factor. For example an increase in light intensity in response to a decrease in ambient light level may be considered a reliable update, whereas an update based on a social media feed may be considered less reliable.

Where the updated setting or settings is based on an acquired pattern of historical use or input, the confidence metric may be based on a property of the historical pattern. A first property is the length of the pattern—if an updated pattern is determined based on weeks or months of user data, a confidence metric may be set higher than if an updated setting is based only on a few days or hours of historical data.

A second property is the degree of correlation of the pattern. In the case that the pattern represents repetition, self-correlation may be the appropriate property. For example if a user repeats the same actions regularly, for example setting an energising lighting setting for an exercise session for two hours on Sunday mornings, the consistency of that setting can be measured. If the time of the setting varies, say sometimes starting at 10 am and other times at 10.30 am, of if the setting is only applied on three out of four Sundays per month on average, a low confidence metric may be assigned. If however the setting has been started every Sunday for six weeks and is always started at 10 am to within a margin of five minutes, then a higher confidence metric may be assigned.

The correlation could also be between a currently detected input or pattern, and a historical pattern. A historical pattern may provide an indication that a user likes to have a relaxing setting in the living room starting at 9 pm for an hour in the evening, followed by having a shower for 15 minutes, and then using a reading light in the bedroom for 20 minutes, for reading in bed, before turning the light off. If the system detects the same relaxing setting in the living room at 9 pm for one hour, followed by the bathroom light (or detection of the shower if this is networked to the lighting system) for 15 minutes, it may determine an update to turn on the reading light. If the historical pattern is matched very closely, the confidence metric may be high. If however the degree of matching with the historical pattern is lower, say the relaxing setting starts earlier, or is longer or a slightly different brightness, or the shower is for 30 minutes for example rather than 15, then the confidence metric may be reduced.

A confidence metric may be determined based on the time period until the update takes place, or for the duration of the updated time period, ie either or both of time periods t1 and t2 of FIG. 7. If the update is scheduled sufficiently far in the future, a lower confidence metric may be applied to reflect a large number of possible variables between the present time and the update being effected. Also, a user may accept or decline the update at leisure, for example, when he or she next passes a lighting control panel or picks up a remote user interface. If the update is scheduled to take effect in a shorter time, the confidence metric may be set lower. If the duration of the update is long, then it may be considered to have a greater effect on a user, and therefore a confidence metric may be reduced, while an update which will only last for a shorter time may not be considered so relevant to a user, and may therefore have a higher confidence metric.

Lastly, previous user inputs, to accept or decline a proposed update may be taken into account for future updates, as may corrective actions to "undo" an automatically applied update. For example, if an update to increase the brightness of lighting in a particular area in response to a decrease in ambient brightness (eg because of a cloud passing overhead) is proposed on a number of occasions, the frequency with which the proposal is accepted can be used to control the associated confidence metric. If the proposed change is accepted a sufficiently high percentage of the time, or a particular number of times, the metric may be increased so that the change becomes automatic in future. If however a change to turn on a light when a particular user enters a room is applied automatically, but the user consistently turns the light back off quickly, the associated confidence metric is reduced, so that the change is only recommended in future.

The confidence metric may be based on a combination of factors, such as those described above. Such factors may be weighted, and combinations may reinforce one another, or cancel out, to provide an overall confidence metric.

A confidence metric, or factors making up the overall confidence metric, may vary or evolve throughout the duration of the updated period. For example, updates do not need to be applied in a sharp/instantaneous way. The system can, for example, make the lights slowly transition from the current settings towards the updated ones, and as time passes without user feedback to the contrary, the confidence factor increases. Within a certain time window the system may decide not to prompt the user for confirmation since so far he/she has not responded negatively, while if the sensors detect unexpected or abnormal behaviours throughout this transitional effect, that might reduce the confidence metric, and force a prompt to the user.

In the case that confirmation is not required, the process advances to step S610, the updated setting or pattern is applied, and then proceeds to optional step S614 in which a user feedback history is updated.

In the case that step S614 is reached from step S610, there may not be any user feedback, and the process can loop back to detecting inputs at S602. However step S610 may comprise a monitoring period, and detect any subsequent input in response to the updated setting or pattern, such as an undo input. The timing of any subsequent user input can also be monitored, for example to determine the delay from the setting being applied to the subsequent user input. This delay can be interpreted by the system to affect future proposed updates to settings or patterns. For example, if after a certain delay no input or feedback is detected, this can be interpreted as confirmation of a correctly predicted update, and any changes or inputs after such a delay period are interpreted as unrelated to the update applied at S610, or at least reliance on such inputs is significantly reduced. Such a period may be 5 or 10 seconds for example. Rather than such a binary approach, a significance weighting may be applied which diminishes with increasing delay period, so that responses received sooner after the update are given greater significance than those received later.

In the case that confirmation is required, the process proceeds to step S608 and a prompt for user confirmation is issued. Prompts may be provided in a number of different ways as described above. Step S612 determines the user response. The response may be provided in a number of different ways as discussed above. If the response is positive, ie the update is accepted, then the updated settings are applied in step S610. If the update is declined, then the process moves to the optional step S614 where a stored user input history is updated. The negative response from the user at step S612 is noted and may be used to affect future proposed updates to settings or patterns. Optional step S614 may also perform monitoring for further inputs, as described above. The process then loops back to detecting inputs at step S602.

User feedback or responses in relation to steps S612 and S614 have been described in a binary sense, with users having essentially a yes/no option at S612 and the possibility to "undo" an applied update at S614. However, in some cases user feedback or input may be to partially accept a change or update. For example if an automatic update reduces a lighting level by 80%, a user may approve of the reduction in brightness, but not the extent. The user may therefore respond by providing an input to instead effect a 50% reduction in lighting level. In another example, the systems may prompt a user for confirmation of a proposed change to increase the colour temperature for 1 hour. Again the user may partially accept, but provide input that the duration should be extended to 2 hours. In such cases, the system can interpret such feedback, taking into account the degree or extent of acceptance, and may update confidence metrics and future proposed updates accordingly.

Some specific examples are provided to illustrate various possible scenarios:

In a first example, a user has a fitness watch which keeps track of his motion by means of an accelerometer and/or heart rate monitor. The user is working out at home, and soon after starting e g running in the treadmill, the system detects an increased activity via the fitness band. If necessary, the system collects this data for some limited period to ensure reliability of the data and compares it with a set of known patterns. The result of the comparison determines that the user is most likely running at a constant pace (due to the repetitiveness of certain movements). As a result, the system concludes that the user is working out, and control logic of the system determines that an energizing light setting of e.g. 5500K is most suitable for that type of activity.

Additionally, the user normally runs on the treadmill in stages, stopping to rest and recover for a few minutes every e.g. 10 km ran. During these recovery periods the fitness band measures a decreased activity, which would normally trigger the controller to switch back to a relaxing scene to help the user wind down. However, this would be constituted by the user as a false positive since he/she is not interested in winding down and expects to continue briefly with the exercise.

However, the controller additionally has access to the user's agenda (or alternatively, his gym's digital dossier) and notices that at that time of the day/week the user normally goes to the gym for 2 hours. As a result, the control logic estimates that he will attempt to keep working out for two hours. Therefore, the logic determines to update the usual function and ignore the reduced activity detected by the fitness band and only revert to reacting to such an input after the 2 hour period has elapsed. This means that only after 2 hours of activity will it switch back to the previous scene or a relaxing one as a result of a reduced activity sensed by the fitness band.

The controller determines a confidence factor for this update, and a significant factor is the length of time for which the update will have effect (2 hours). Also, there may be a strong correlation between the time window for exercising, and the heart rate/motion measurements, but the user is working out at home, rather than at the gym, reducing the overall confidence. Combining the various factors, the result is that the confidence metric is below a threshold value, and confirmation from the user is sought. In this case the fitness watch has a screen which can display an appropriate message or icon, possibly accompanied by an audio or haptic alert. By simply pressing a button on the fitness watch, the user can confirm that he/she will most likely be repeating the usual pattern of exercise, and as such the controller will not change the lighting before the relevant 2 hour period has elapsed. In this way the user is not unnecessarily bothered to provide lots of details and configure the system in a complex way, but just needs to confirm to the controller that its selection is correct.

In a second example a user has a smart watch that measures her heart rate which she uses to keep track of her heart behaviour since she has high blood pressure; the watch also includes an accelerometer.

In the daytime, the system detects that the user's heart rate is increasing rapidly while no significant activity is being detected, the system concludes this to be anger/stress related. As a result, the recommendation engine determines that a relaxing scene should be applied and the system moves all lamps to a relaxing setting (e.g. 1800K). The difference in lighting is deemed sufficiently subtle that the confidence metric is high, and the lighting is updated automatically. However, the user does not want her lights changing constantly in her office, so the first time she notices the controller making the update she recalls the previous settings via her smart-watch.

When at home she continues working and her stress levels rise, and again the lighting is updated with a relaxing setting. But in this case does the user does not overrule the recommended settings because she wants to relax.

Initially, the confidence setting in the daytime changes is reduced because the automated changes are declined, while confidence in the evening pattern remains high as the changes are accepted. Over time however the controller collects the feedback from the user and determines that when increased heart rate activity is noticed, relaxing scenes should only be applied when the user is at home (detected via geofencing and/or beacons for example) or on the lights in the users living room, but not when she is at the office, and as collected data supports this overall pattern, the confidence in it is increased.

In a third example, a user normally has dinner and afterwards goes to the living room to read newspapers on her tablet. For this she uses a more relaxing scene where few lights are on and at a fairly warm temperature (e.g. 3500K). Normally the tablet detects only minor motions, which would normally lead the controller to think she is not doing major activity, and as such the scenes need not be changed.

On a specific day, her best friends post on her favourite social media (e.g. Facebook) that they are going to be in town, and she responds by inviting them for dinner at her place the following day. In this situation she wants to have a more active scene in the living room. However, the controller detects that no major changes have occurred with respect to the usual pattern from the tablet (i.e. there is still very little or no activity), and as a result no update would typically be determined.

However, the user has also enabled the extended features in her lighting system where the recommender engine can trigger different effects based on social media content. In this case, the recommender detected the keywords "friends", "fun", and "9 pm" on her messages, and as a result concludes that at the time of the usual relaxing newspaper reading a different activity will take place. Particularly, the keywords "friends" and "fun" are mapped to a more colourful and vivid scene, and the colour palette can be extracted from either previous scenes edited by the user or by looking at a database and detecting the most common colours associated with those keywords, to derive an updated setting.

Because there is a significant time before the event (in this example, the update will not be put into effect until 9 pm the following day) the confidence metric is decreased, and may not meet the threshold. Therefore as further confirmation, the controller can send a notification to the user's tablet to ask her for confirmation that the usual routine has been changed as a result of finding those key words.

As a further option, the controller could also wait beyond the detected start-time of the event/activity. If the user then decides to manually activate a party light setting, the controller can inform her that settings have already been arranged for her and she only needs to accept for the system to handle everything automatically. In this case the recommender is simplifying the selection process for the user even when input was not given in time by the user.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor, such as controller 402 or control system 502 may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure, such as the method illustrated by the flow diagram of FIG. 6, may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a lighting system for providing illumination of a space, said method comprising:
   detecting one or more input events relating to said lighting system;
   determining an updated illumination pattern based on said one or more input events;
   determining a confidence metric associated with said updated illumination pattern, wherein the confidence metric represents a likelihood that said updated illumination pattern is desired by or acceptable to a user in said space;
   determining whether or not to apply said updated illumination pattern automatically, based on a determination whether said confidence metric is above a threshold or not;
   providing, in the case that the updated illumination pattern is not applied automatically, a prompt to said user indicative of said updated pattern;

receiving an input from said user in response to said prompt; and controlling said lighting system to apply said updated illumination pattern conditionally in response to said received user input, wherein said updated illumination pattern comprises a time sequence of lighting settings, and wherein said confidence metric varies in accordance with the length of said time sequence.

2. The method according to claim 1, wherein said confidence metric varies in accordance with a measure of difference between said updated illumination pattern and the pattern it is intended to update.

3. The method according to claim 1, wherein said confidence metric varies in accordance with the type or types of input upon which the updated illumination pattern is based.

4. The method according to claim 1, wherein said confidence metric varies in accordance with previously received inputs in response to substantially the same updated illumination pattern.

5. The method according to claim 1, wherein said one or more inputs on which said updated illumination pattern is based comprises a historical time sequence of inputs, and wherein said confidence metric varies in accordance with length of said historical time sequence.

6. The method according to claim 1, wherein said one or more inputs on which said updated illumination pattern is based comprises a historical time sequence of inputs, and wherein said confidence metric varies in accordance with a measure of correlation of detected inputs within that sequence.

7. The method according to claim 1, wherein said updated illumination pattern relates to a point or period of time in the future, and wherein said confidence metric varies in accordance with the time remaining until said point or the beginning of said period.

8. The method according to claim 1, wherein said one or more input events include inputs from one or more sensors adapted to sense conditions in said space or associated with a user of the lighting system.

9. The method according to claim 8, wherein said one or more sensors includes at least one of a biometric sensor, a light sensor, or a motion sensor.

10. The method according to claim 1, wherein said one or more input events include information received from an application accessed over a network connected to said lighting system.

11. The method according to claim 10, wherein said application includes at least one of a user schedule or calendar application, or a social media application.

12. A lighting control system for providing illumination of a space comprising:

a controller adapted to receive one or more input events related to said lighting control system, determine an updated illumination pattern based on said one or more input events, determine a confidence metric associated with said updated illumination pattern, wherein the confidence metric represents a likelihood that said updated illumination pattern is desired by or acceptable to a user in said space, and determine whether or not to apply said updated illumination pattern automatically, based on a determination whether said confidence metric is above a threshold or not;

a user output interface adapted to output a prompt to said user indicative of said updated illumination pattern in the case that said updated illumination pattern is not applied automatically; and a user input interface adapted to receive an input from said user in response to said prompt;

wherein said controller is adapted to apply the updated illumination pattern conditionally in response to said received user input, and wherein said updated illumination pattern comprises a time sequence of lighting settings, and wherein said confidence metric varies in accordance with the length of said time sequence.

13. The lighting control system of claim 12 wherein said confidence metric is additionally determined based at least on one of:

a measure of difference between said updated illumination pattern and the pattern it is intended to update, the type or types of input upon which the updated illumination pattern is based, previously received inputs in response to substantially the same updated illumination pattern, when said one or more inputs on which said updated illumination pattern is based comprises a historical time sequence of inputs, a length of said historical time sequence or a measure of a correlation of detected inputs with said sequence, and when said updated illumination pattern relates to a point or period of time in the future, a time remaining until said point or the beginning of said period.

14. A non-transitory computer-readable medium comprising computer program code which, when executed on one or more processors, performs a method of controlling a lighting system for providing illumination of a space, said method comprising:

detecting one or more input events relating to said lighting system;

determining an updated illumination pattern based on said one or more input events:

determining a confidence metric associated with said updated illumination pattern, wherein the confidence metric represents a likelihood that said updated illumination pattern is desired by or acceptable to a user in said space;

determining whether or not to apply said updated illumination pattern automatically, based on a determination whether said confidence metric is above a threshold or not;

providing, in the case that the updated illumination pattern is not applied automatically, a prompt to said user indicative of said updated pattern;

receiving an input from said user in response to said prompt; and controlling said lighting system to apply said updated illumination pattern conditionally in response to said received user input, wherein said updated illumination pattern comprises a time sequence of lighting settings, and wherein said confidence metric varies in accordance with the length of said time sequence.

* * * * *